(12) United States Patent
Effler et al.

(10) Patent No.: US 9,853,515 B2
(45) Date of Patent: Dec. 26, 2017

(54) RING ELEMENT FOR A ROTOR OF AN ELECTRIC MOTOR

(75) Inventors: Josef Effler, Steinenbronn (DE); Christoph Wagner, Remseck-Pattonville (DE); Joachim Schadow, Stuttgart (DE); Juergen Hein, Kornwestheim (DE); Joerg Goehner, Boeblingen-Dagersheim (DE)

(73) Assignee: Robert Bosch GmbH, Stuttgart (DE)

( * ) Notice: Subject to any disclaimer, the term of this patent is extended or adjusted under 35 U.S.C. 154(b) by 48 days.

(21) Appl. No.: 14/232,872

(22) PCT Filed: Jun. 26, 2012

(86) PCT No.: PCT/EP2012/062333
§ 371 (c)(1),
(2), (4) Date: Jan. 14, 2014

(87) PCT Pub. No.: WO2013/010757
PCT Pub. Date: Jan. 24, 2013

(65) Prior Publication Data
US 2014/0139053 A1 May 22, 2014

(30) Foreign Application Priority Data
Jul. 18, 2011 (DE) .......................... 10 2011 079 332

(51) Int. Cl.
*H02K 3/30* (2006.01)
*H02K 3/50* (2006.01)
(Continued)

(52) U.S. Cl.
CPC ................. *H02K 3/50* (2013.01); *H02K 3/30* (2013.01); *H02K 3/38* (2013.01); *H02K 3/51* (2013.01); *H02K 7/145* (2013.01)

(58) Field of Classification Search
CPC .. H02K 3/30; H02K 3/50; H02K 3/38; H02K 3/51; H02K 7/145
(Continued)

(56) References Cited

U.S. PATENT DOCUMENTS 2,381,533 A * 8/1945 Forss ...................... H02K 13/04
310/233
3,196,304 A * 7/1965 Koehly .................. H02K 3/345
310/194

(Continued)

FOREIGN PATENT DOCUMENTS

| CN | 1098567 A | 2/1995 |
|---|---|---|
| CN | 1669203 A | 9/2005 |

(Continued)

OTHER PUBLICATIONS

English translatio for WO 2005124968.*
(Continued)

*Primary Examiner* — Bernard Rojas
*Assistant Examiner* — Ahmed Elnakib
(74) *Attorney, Agent, or Firm* — Maginot, Moore & Beck LLP

(57) ABSTRACT

A ring element includes a convex, in particular rounded, surface element for arrangement on at least one axial end region of a winding section of an electric motor rotor. The surface element provides a minimum radius curvature for supporting an inner layer of a rotor winding on the winding head. An insulating lamination element for an electric motor rotor onto which a rotor winding is intended to be wound includes the ring element. An electric motor, in particular a universal motor, includes a rotor with a rotor winding having the ring element. An electric machine tool, in particular a handheld electric machine tool such as an angle grinder, a drill, a saw or the like, includes the electric motor.

14 Claims, 5 Drawing Sheets

(51) Int. Cl.
  *H02K 7/14* (2006.01)
  *H02K 3/51* (2006.01)
  *H02K 3/38* (2006.01)
(58) Field of Classification Search
  USPC ........ 310/50, 260, 270, 43, 261.1, 262, 214,
    310/215, 217, 42, 45, 185, 156.45,
    310/154.22; 29/598
  See application file for complete search history.

(56) References Cited

U.S. PATENT DOCUMENTS

| | | | | |
|---|---|---|---|---|
| 3,831,268 | A * | 8/1974 | Boyd | H02K 1/26 |
| | | | | 29/525 |
| 4,213,070 | A | 7/1980 | Lund et al. | |
| 4,400,639 | A * | 8/1983 | Kobayashi | H02K 3/345 |
| | | | | 310/214 |
| 4,888,508 | A * | 12/1989 | Adam | H02K 3/345 |
| | | | | 29/598 |
| 5,304,885 | A * | 4/1994 | Wong | H02K 3/345 |
| | | | | 310/216.115 |
| 5,449,963 | A * | 9/1995 | Mok | H02K 3/38 |
| | | | | 310/216.115 |
| 6,552,468 | B2 * | 4/2003 | Lau | H02K 13/006 |
| | | | | 310/270 |

FOREIGN PATENT DOCUMENTS

| | | | |
|---|---|---|---|
| CN | 101507086 A | | 8/2009 |
| DE | 30 44 537 A1 | | 9/1981 |
| EP | 0 515 783 A1 | | 12/1992 |
| EP | 0 630 095 A1 | | 12/1994 |
| FR | 2247842 | * | 5/1975 |
| FR | 2 778 282 A1 | | 11/1999 |
| GB | 505477 | * | 10/1937 |
| GB | 1549778 | * | 8/1979 |
| WO | WO 2005124968 | * | 12/2005 |

OTHER PUBLICATIONS

English translatio for FR 2247842.*
Dictionary difinition for the word CLIP.*
Properties of molded Phenolic www.reblingplastics.com/phenolic.htm.*
English machine translation of WO 2005124968; Ralf et al.; Dec. 2005; WIPO.*
International Search Report corresponding to PCT Application No. PCT/EP2012/062333, dated Jun. 14, 2013 German and English language document) (5 pages).

* cited by examiner

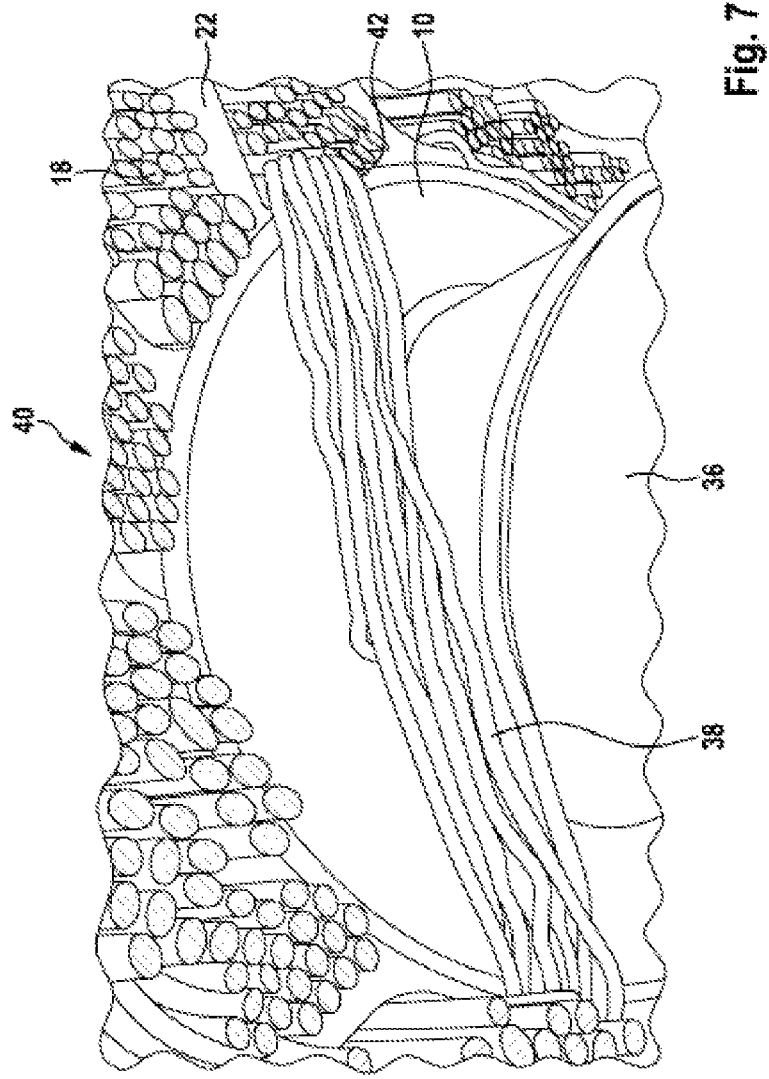

RING ELEMENT FOR A ROTOR OF AN ELECTRIC MOTOR

This application is a 35 U.S.C. §371 National Stage Application of PCT/EP2012/062333, filed on Jun. 26, 2012, which claims the benefit of priority to Serial No. DE 10 2011 079 332.1, filed on Jul. 18, 2011 in Germany, the disclosures of which are incorporated herein by reference in their entirety.

BACKGROUND

The disclosure is based on a ring element to be arranged at at least one axial end region of a winding section of an electric motor rotor. Furthermore, the disclosure relates to a lamellar insulating element which comprises a ring element according to the disclosure. Finally, the disclosure relates to an electric motor on the rotor of which such a ring element is arranged, and to an electrical power tool that comprises an electric motor according to the disclosure.

Universal motors, i.e. series-wound motors in which the rotors bear a rotor winding that is supplied with current via a commutator, are generally used in electric motors for electric power tools, in particular an angle grinder, a drill, a saw, jigsaws or the like. In the region of the end windings at the axial end regions of a winding section, the inner layers of the winding in particular have a small radius of curvature and are exposed to high mechanical and thermal loads. For instance, in the compact installation space, the inner layers of the rotor windings have a very small bending radius, the wire coils being exposed to a high thermal loads and having to withstand centrifugal forces. It is known in this respect to use fixing of the winding layers by means of a trickle impregnating resin for improved connection, with the aim of obtaining a homogeneous winding cross section and maintaining minimum bending radii. However, the innermost winding layer cannot be definitively fixed in the winding assembly, lying as it were in free space in the region of the end windings at one axial end region of the winding section of the electric motor rotor and resin fixing being unable to take hold.

This gives rise to the problem that the inner winding layer is not sufficiently fixed in the region of the end windings and is insufficiently protected from both thermal and mechanical loads, in particular from high vibrations and centrifugal forces.

In particular under dynamic load changes, such as take place for example in the case of electric power tools operating at full load and thereafter when idling at high speeds, the temperature of the rotor windings rises to above 210° C., and so a critical threshold temperature for the enamel insulation is reached. It is thereby found that, in 70% of these cases of failure, the inter-winding shorts are in turn caused in the inner layers of the end windings, and so approximately 50% of all cases of motor failure are attributable to inter-winding shorts in the innermost layers of the end windings.

SUMMARY

In a first aspect, the disclosure proposes a ring element which comprises a convex, in particular rounded-off, partial surface to be arranged at at least one axial end region of a winding section of an electric motor rotor. The partial surface has a minimum radius of curvature $R_d$ for supporting an inner layer of a rotor winding on the end winding. The ring element serves the purpose of supporting the innermost layer of the rotor winding on the end winding, and so it is secured against mechanical loads, thermal coupling to the laminated rotor core is established and a minimum bending radius of the wire coils is provided, whereby mechanical and thermal loads on the innermost layer can be lessened, and consequently inter-winding shorts can be reduced. In other words, a critical portion of the rotor coil in the region of the end windings is provided underneath with a ring element which has a convex or rounded-off form of a wire-guiding partial region that is adapted approximately to a natural path of the rotor winding. The ring element may be formed for example as a longitudinal section through a ring torus. It has a flat partial surface, which can be aligned in the direction of the iron laminated core bearing the rotor windings, and a rounded-off, for example semicircular or circular, partial surface, which can be aligned in the direction of the end windings. The ring element has the task of neutralizing a critical bending radius and forcibly guiding the winding layer. The previous empty space in the end winding between the inner winding layer and the laminated rotor core is filled and the innermost layer is mechanically supported. Additional insulation and fixing by a trickle impregnating resin can establish a connection between the innermost winding layer and the ring element. Consequently, critical bending radii of the copper wire are prevented, fixing of the coil is made possible and resin-bonding of the rotor coil achieves mechanical fixing of the end windings. The influence of centrifugal forces and the thermal loading on the innermost winding layer are reduced.

With the disclosure, mechanical fixing and a reduction of the bending angle of the inner winding layers at the axial end regions of a winding section of an electric motor rotor are advantageously provided, and so the risk of inter-winding shorts at the end winding of an electric motor rotor can be reduced, and consequently the service life of an electric motor can be increased.

According to an advantageous development of the disclosure, the ring element may be formed in one piece with a lamellar insulating element. A lamellar insulating element serves for the fixing and alignment of the winding layers, and consequently for the formation of defined north pole/south pole alignments of the magnetic field of the rotor. The lamellar insulating element insulates the winding layers at the axial end region of the winding section from the laminated rotor core. The ring element may be formed in one piece with the lamellar insulating element, and so only a small number of rotor components are required for the assembly of a rotor blank.

On the basis of the previous exemplary embodiment, it may be advantageous to mold the ring element onto the lamellar insulating element by an injection-molding or foaming process or to fashion it from the lamellar insulating element by a forming process. Thus, for example, the ring element may be injection-molded onto the lamellar insulating element by means of a two-component process. The ring element may be molded onto a lamellar insulating element by means of a known foaming process. It is also conceivable that a lamellar insulating element with a fashioned ring element may be created by a forming process being carried out on a complete component of insulating material. Thus, for example, a moldable insulating material may be subjected to mechanical forming by suitable pressing tools to form a lamellar insulating element with an integrated ring element. Furthermore, it is conceivable to form the lamellar insulating element in one piece with an integrated ring element during production.

As an alternative to the aforementioned embodiment, in a further advantageous configuration the ring element may be able to be connected to a lamellar insulating element. For this purpose, it is also advantageously appropriate that the lamellar insulating element can be clipped on, adhesively attached and/or attached by welding. For this purpose, the ring element may have for example insertion lugs or engagement lugs, and the lamellar insulating element may have insertion recesses or engagement recesses of a complementary form, or vice versa. It is possible here to produce the ring element from a different material than the lamellar insulating element, for example from a material of high thermal conductivity, in order to pass on waste heat from the end windings to the laminated rotor core. Furthermore, already existing lamellar insulating elements may be developed or retrofitted by adding ring elements to achieve the advantages according to the disclosure. In principle, the lamellar insulating elements are brought together on a rotor spindle without fastening to the ring element. Connecting means, for example insertion or engagement lugs and corresponding recesses, allow the ring element to be clipped onto an existing lamellar insulating element and for example fastened to the inside diameter. Furthermore, it is conceivable to connect the ring element permanently to the lamellar insulating element, for example by means of adhesive bonding or ultrasonic welding.

According to an advantageous development of the disclosure, the ring element may consist of an insulating material, in particular of a heat-resistant plastic with a maximum operating temperature $T_C > 210°$ C. On account of the high mechanical and thermal loading and the required insulation of the winding wires with respect to the laminated core of the rotor, the ring element is advantageously formed from an electrically nonconductive material, which nevertheless should have a high thermal conductivity. The maximum operating temperature of the ring element should in this case be over 200° C., or better 210° C., since tests have shown that such temperatures can be reached in a locked-rotor mode, in which the electric motor is operated in periodic alternation between high load and no load. Up to this temperature, the ring element should have its electrically insulating and mechanically stabilizing effect, in order to ensure a long service life of the electric motor.

According to an advantageous development of the disclosure, the ring element may lie a ratio of outside diameter to inside diameter $R_a/R_i$ in the range of 1.3 to 1.8, in particular 1.5 to 1.6. This ratio achieves a relatively low mass inertia of the ring element and a sufficiently large supporting area is provided for the bending radius of the inner rotor winding layer. In addition or as an alternative to this, the ratio of the outside diameter to the thickness $R_a/d$ of the element can lie in the range of 10 to 15, in particular 12.5 to 13.5, or alternatively the thickness d can lie in the range of 1.5 mm to 3.5 mm, preferably 2 mm to 3 mm. Consequently, a relatively thin ring element is proposed, and so the overall size of the rotor is changed only slightly, and a form of the end windings of a small volume can be achieved. Nevertheless, the predetermined bending radius is sufficient to achieve high mechanical stability and resistance to high temperatures. Alternatively and/or in addition, the radius of curvature $R_d$ of the convex partial surface of the ring element may correspond substantially to the thickness d, and so the inner winding wire can be guided along the curvature of the ring element, which is flat on the one longitudinal side and convexly curved on the other side, or has a radially curved and preferably circular outer contour of the surface. As a result, the clearance between the end winding and the lamellar insulating element is filled by the ring element, the inner winding layer is mechanically supported and the innermost layer of the rotor winding is guided in a defined manner.

In an independent aspect, the disclosure proposes a lamellar insulating element for an electric motor rotor for being wound with a rotor winding which comprises a ring element according to one of the preceding exemplary embodiments. The ring element may be formed in two parts with the lamellar insulating element and the parts connected to one another, for example adhesively bonded, made to engage or screwed together, or the lamellar insulating element may be formed in one piece with the ring element, for example formed in an injection-molding or foaming process, by means of a two-component technique, or an additional ring element may be fashioned from the lamellar insulating element by a forming process. Such a lamellar insulating element may be used in an existing design of a lamellar electric motor without changing the existing structure or the basic design, and consequently offers the advantages according to the disclosure.

In a further aspect, the disclosure proposes an electric motor, in particular a universal motor, i.e. a series-wound motor, which has a rotor with a rotor winding, on which at least one ring element according to one of the preceding exemplary embodiments is comprised. This makes the rotor winding mechanically and thermally more robust, and so a longer service life and higher resistance to inter-winding shorts can be achieved, in particular in the region of the end windings.

Finally, a further independent aspect proposes an electric power tool, in particular a hand-held electric power tool such as an angle grinder, a drill, a saw or the like, which comprises an aforementioned electric motor. In particular in an electric power tool with a compact installation space and a motor of a small volume, which is exposed to a large number of dynamic load cycles, experience shows that inter-winding shorts frequently happen due to the high thermal and mechanical loads occurring. The use of a proposed ring element on both end portions of a rotor winding of the electric motor allows the service life and quality of the power tool to be increased considerably. Consequently, guarantee costs can be reduced, the image of a brand can be improved and the value retention of the power tool can be increased.

BRIEF DESCRIPTION OF THE DRAWING

Further advantages emerge from the following description of the drawings. In the drawings, exemplary embodiments of the disclosure are represented. The drawings, the description and the claims contain numerous features in combination. A person skilled in the art will expediently also consider the features individually and put them together in meaningful further combinations.

In the drawings:

FIG. 7 shows a cutout of a detail of an end winding with an exemplary embodiment of a ring element.

DETAILED DESCRIPTION

Figure 1:
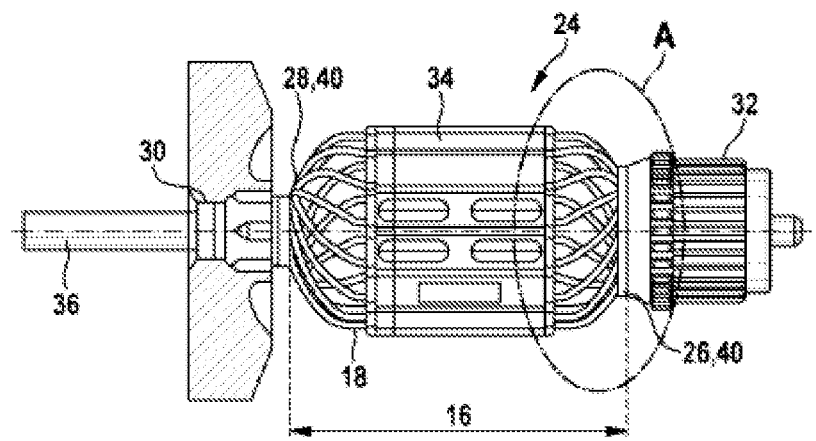
FIG. 1 shows a rotor of an electric motor in a side view.

In the figures, components that are the same or similar are denoted by the same reference numerals.

For an explanation of the disclosure, FIG. 1 shows in a side view a rotor 24 of a universal motor, in which a rotor winding 18 is wound along a laminated rotor core 34. The rotor 24 has a rotor spindle 36, along which all the rotating parts of the rotor are arranged for rotation therewith. The laminated rotor core 34 bears the winding 18, which are formed at both its axial end regions 26, 28 into end windings 40. In this case, a first end region 28 is assigned to the bearing 30 of the rotor 24, and a second end region 26 is assigned to the commutator 32 of the rotor 24. At the commutator 32, current is transferred via carbon brushes (not represented) to the rotor winding 18, a constantly rotating magnetic field being generated by rotation of the rotor as a result of current being applied in an alternating manner to the rotor winding 18 in the rotor 24. For the directed guidance of the enameled copper wires of the rotor winding 18, they are laid in slots of the laminated rotor core 34. At the respective ends of the winding region 16, the end windings 40 are formed in such a way as to guide the winding layers back along the laminated rotor core 34. Empirical tests have shown that the greatest number of inter-winding shorts of the rotor 24 that lead to failure of the electric motor occur in the region of the end windings 40. The cause of this lies in particular in the locked-rotor mode, i.e. in high dynamic load changes, in which a limit temperature is exceeded in the end windings 40, and so the enameled copper wires no longer have an insulating effect and short-circuits occur between the rotor windings, leading to destruction of the rotor winding 18. On account of the high mechanical and thermal loads on the end windings 40, careful production of this region of the rotor winding is decisive for the service life of the electric motor. Thus, 70% of all angle grinder motors fail as a result of inter-winding shorts, with again 70% of all inter-winding shorts occurring in the end windings, and consequently in total over 50% of all cases of motor failure being attributable to qualitative defects of the end windings.

Figure 2:
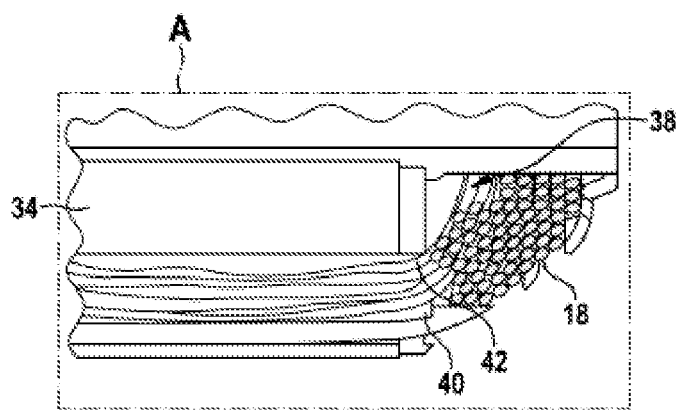
FIG. 2 shows a partial cutout of an end winding according to the prior art.

In FIG. 2, an end winding 40 of the prior art is represented in an enlarged form, the innermost winding layer 38 having a very small winding radius 42. The innermost winding layer 38 is freely suspended and is not mechanically supported with respect to the laminated rotor core 34. Both thermally and mechanically, there is only a poor connection with respect to the winding 18 as a whole and the laminated rotor core 34. Trickle impregnating resin for fixing the winding cannot take hold on the innermost winding layer in practice.

Figure 3:
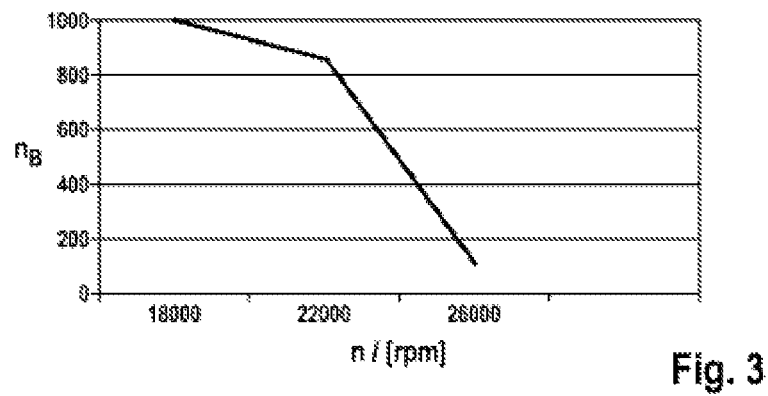
FIG. 3 shows a failure curve of electric motors according to the prior art.

It has been possible to demonstrate by empirical tests that electric motors subjected to high levels of applied current reach a high limit temperature of over 210° C., and so the insulating system comprising enameled copper wires no longer provides sufficient insulation. In what is known as a locking action, the rotor is taken to a low load speed, and so, during the idling that directly follows, high centrifugal forces act together with a high temperature of the rotor winding to replicate the case of a critical application. FIG. 3 shows a number of locking actions $N_B$ against achieved idling speeds n of an electric motor up until failure of the motor when the rotor winding is destroyed, it being clear that, at high idling speeds n, only a small number of locking actions are required to bring about failure of the motor. With respect to locking actions below 18 000, up to 1000 locking actions can be carried out before failure of the electric motor is caused by inter-winding shorts. Consequently, with increasing speed, the durability of the rotor dramatically decreases, in particular under dynamic load changes.

Figure 4:
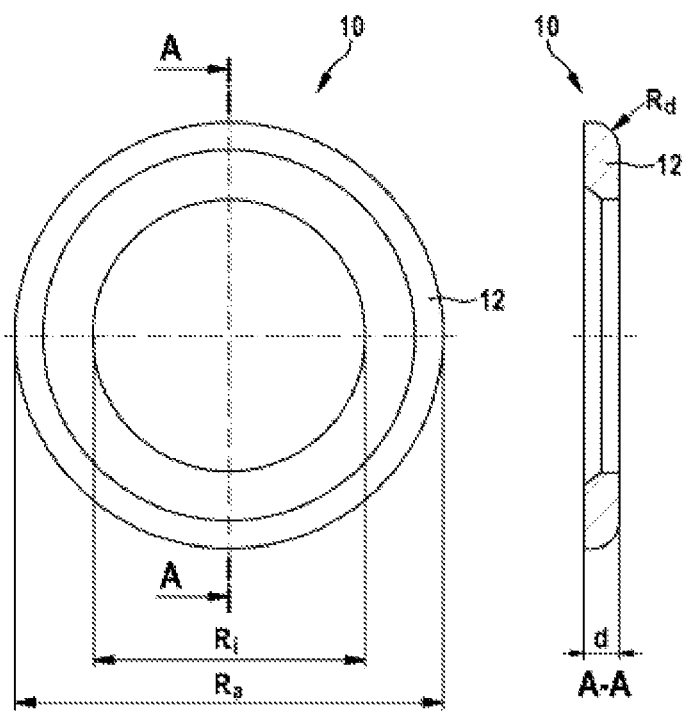
FIG. 4 shows an exemplary embodiment of a ring element according to the disclosure.

In order to offer an improvement in the resistance to such dynamic load changes or locking actions, in FIG. 4 a first exemplary embodiment of a ring element according to the disclosure for the mechanical support of the end windings is represented. The ring element 10 has a flat-extending side surface and a convex or radially rounded-off partial surface 12, which supports the innermost layer of the winding with optimal running of the rotor winding. Consequently, the tight bending radius of the innermost winding layer is neutralized and the rotor winding is forcibly guided. Furthermore, the empty space between the innermost winding layer and the lamellar insulating element is filled, and so the critical region of the winding is mechanically supported, and it is possible for trickle impregnating resin to take hold. The ring element has a very much smaller thickness than the diameter, the thickness at the same time corresponding to the bending radius. A value of 2 to 3 mm is regarded as optimum as the bending radius for customary electric power tools. Thus, for example, the ring element may have an outside diameter of 30 to 35 mm and an inside diameter of 18 to 23 mm.

Figure 5A:
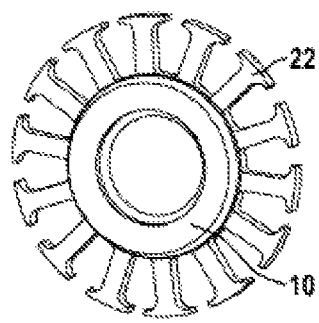
FIG. 5 shows combinations of ring elements and lamellar insulating elements according to exemplary embodiments of the disclosure in a perspective view.
Figure 5B:
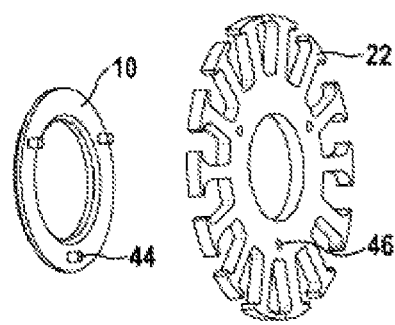
Figure 5C:
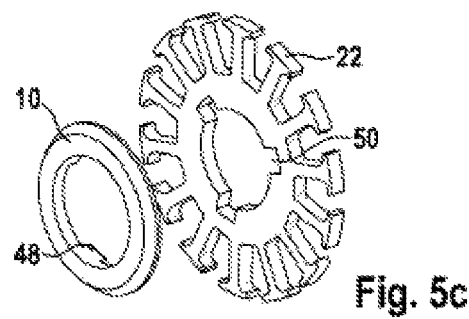

In FIGS. 5a to 5c, alternative exemplary embodiments of the combination of the ring element and the lamellar insulating element 22 are represented. In FIG. 5a, a one-piece form of the ring element 10 and the lamellar insulating element 22 is shown. The lamellar insulating element 22 has tooth-shaped lamellae, by which the winding strands are guided and alignments of the rotor windings, and consequently of the magnetic rotor field, are thereby predetermined. The ring element 10 serves for supporting the end windings, and so a critical innermost bending angle can be prevented and the inner winding layer can be mechanically supported. In FIG. 5b, a two-part set comprising a ring element 10 and a lamellar insulating element 22 is represented. The ring element 10 has three insertion lugs 44, which can be inserted into corresponding insertion recesses 46 of the lamellar insulating element 32 for fixing. In this way, mechanical fixing of the two elements 10, 22 can be achieved. FIG. 5c shows an alternative exemplary embodiment of a two-part combination of a ring element 10 and a lamellar insulating element 22, the ring element 10 having engagement lugs 48, into which three engagement lug recesses 50 in the inside diameter of the lamellar insulating element 22 can be inserted, in order to achieve a mechanical connection of the two elements. When the rotor blank is assembled, a high production rate can be achieved by a one-part or non-mechanically connected two-part configuration of the ring element 10 and the lamellar insulating element 22. The ring element may in this case be clipped or pushed onto the lamellar insulating element, adhesively bonded, ultrasonically welded formed by a two-component process or a foaming process or be fashioned in one piece from the lamellar insulating element.

Figure 6A:
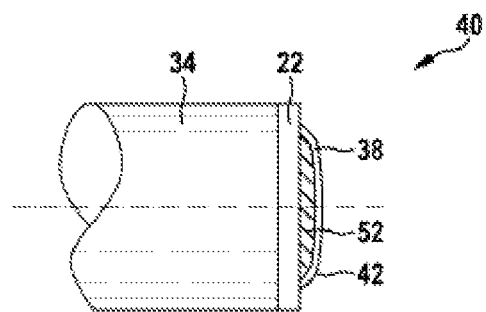
FIG. 6 schematically shows a comparison of an end winding of the prior art and an end winding according to the disclosure.
Figure 6B:
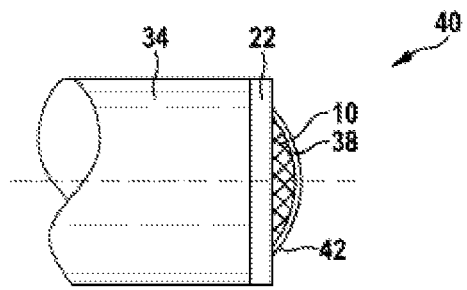

In FIGS. 6a and 6b, a comparison of an end winding 40 of the prior art and an exemplary embodiment according to the disclosure of an end winding 40 is schematically represented. Represented in FIG. 6a is a laminated rotor core 34 of the prior art, on the axial end region of the winding section of which a lamellar insulating element 22 is arranged. The innermost layer of the rotor winding 38 is guided around a clearance 52, the angling of the innermost winding layer 38 going below a critical bending radius 42, since there is no support and no mechanical fixing of the innermost winding layer 38. There is no stabilization of the inner winding layer 38, either thermally or mechanically, and so inter-winding shorts can occur, in particular in high-speed load-changing operation.

By contrast, FIG. 6b shows an end winding 40, in which a ring element 10 fills the space between the inner winding layer 38 and the lamellar insulating element 22, and so a small angling radius 42 can be achieved. As a result, a much improved thermal and mechanical resistance is achieved and the service life of the electric motor is significantly increased.

After extensive tests on a test bench, it has been possible to demonstrate that an increased service life and reduction of inter-winding shorts in the end-winding region by a factor of 6 to 10 can be achieved by use of the ring element according to the connection. It can consequently be assumed that a reduction in the cases of failure of an order of magnitude of approximately 30% to 50% can be achieved in the case of known electric power tools by the use of a ring element according to the disclosure for supporting the end windings.

Finally, FIG. 7 perspectively shows the use of a ring element 10 in an end winding 40 with a rotor winding 18, in the case of which an inner layer 38 of enameled copper wires is guided over the ring element 10, is supported and is fixed with a relatively great bending radius 42 in an optimum form, and so the risk of inter-winding shorts can be significantly reduced.

The disclosure makes it possible to provide electric power tools that are highly compact, have a great energy density and are able to withstand a high number of dynamic load changes between locked-rotor mode and freely running mode, it being possible for the probability of failure to be drastically lowered, and in this way the longevity of the electric power tool to be significantly prolonged. The way in which the rotor is modified according to the disclosure by the use of a ring element scarcely changes the design of the electric motor, and so a significant improvement in the quality of an existing electric motor can be achieved by a simple measure.

The invention claimed is:

1. A ring element comprising:
   a ring-shaped body configured as an end plate for a laminated rotor core, the ring-shaped body having a circular outer perimeter shape without projections in a radial direction and having a first side and a second side, the first side being flat and configured to be placed against a lamellar insulating element on an end face of an axial end region of the laminated rotor core with the second side facing away from the laminated rotor core, the second side of the ring-shaped body having a convex partial surface arranged radially about a central opening of the ring-shaped body,
   wherein the convex partial surface has a radius of curvature configured to support an inner layer of a rotor winding wound onto the laminated rotor core at the axial end region such that a minimum bending radius of the inner layer of the rotor winding supported on the convex partial surface is maintained,
   wherein the ring-shaped body defines an inside diameter and an outside diameter such that a ratio of the outside diameter to the inside diameter lies in the range of 1.3 to 1.8, and
   wherein the first side of the ring-shaped body has at least one axial protrusion which is configured to be inserted into at least one corresponding recess in the lamellar insulating element,
   wherein the axial protrusion comprises an insertion lug which is spaced apart from the central opening of the ring-shaped body.

2. The ring element as claimed in claim 1, wherein the ring element is configured to be connected to the lamellar insulating element.

3. The ring element as claimed in claim 2, wherein the ring element is configured to be one or more of clipped on, adhesively attached, and attached by welding to the lamellar insulating element.

4. The ring element as claimed in claim 1, wherein the ring element includes an insulating material.

5. The ring element as claimed in claim 4, wherein the insulating material is configured as a heat-resistant plastic with a maximum operating temperature $T_C > 210°$ C.

6. The ring element as claimed in claim 1, wherein the ring element has a thickness lies in the range of 1.5 mm to 3.5 mm, and
   wherein the radius of curvature of the convex partial surface corresponds substantially to the thickness.

7. The ring element as claimed in claim 6, wherein:
   the ratio of outside diameter to inside diameter lies in the range of 1.5 to 1.6, and the ratio of outside diameter to thickness lies in the range of 12.5 to 13.5, or
   the thickness lies in the range of 2 mm to 3 mm, the radius of curvature of the convex partial surface corresponding substantially to the thickness.

8. The ring element as claimed in claim 1, wherein an electric motor includes the rotor with the rotor winding having the ring element.

9. The ring element as claimed in claim 8, wherein the electric motor is configured as a universal motor.

10. An electric power tool, comprising:
    an electric motor including a rotor with a rotor winding and an end plate, the rotor winding being laid in slots of a laminated rotor core, the end plate being positioned between the rotor winding and an end face of the laminated rotor core,
    wherein the end plate is a ring having a first side and a second side, the first side being placed against a lamellar insulating element on the end face of the laminated rotor core with the second side arranged facing the rotor winding and having a convex partial surface arranged radially about a central opening of the ring,
    wherein the partial surface has a radius of curvature configured to support the inner layer of the rotor winding such that a minimum bending radius of the inner layer of the rotor winding supported on the convex partial surface is maintained, and
    wherein the ring defines an inside diameter and an outside diameter such that a ratio of the outside diameter to the inside diameter lies in the range of 1.3 to 1.8,
    wherein a distance of the outside diameter of the ring to a rotor axis is the same or less than a distance of the bottom of the slots of the laminated rotor core to the rotor axis,
    wherein the first side of the ring-shaped body has at least one axial protrusion which is configured to be inserted into at least one corresponding recess in the lamellar insulating element, and
    wherein the axial protrusion comprises an insertion lug which is spaced apart from the central opening of the ring-shaped body.

11. The ring element as claimed in claim 1, wherein the partial surface is configured as a rounded-off partial surface.

12. The electric power tool as claimed in claim 10, wherein the electric power tool is configured as one of an angle grinder, a drill, and a saw.

13. An end plate for a laminated rotor core, comprising:
a ring-shaped body having a circular outer perimeter shape without projections in a radial direction and having a first side and a second side, the first side being flat and configured to be placed against an outer facing surface of a lamellar insulating element arranged at at least one axial end region of a winding section of an electric motor rotor with the second side facing away from the electric motor, the second side of the ring-shaped body having a convex partial surface arranged radially about a central opening of the ring-shaped body,
wherein the convex partial surface has a radius of curvature configured to support the inner layer of the rotor winding at the axial end region such that a minimum bending radius of the inner layer of the rotor winding supported on the convex partial surface is maintained,
wherein a radius of curvature of the convex partial surface corresponds substantially to a thickness of the ring element,
wherein the ring-shaped body defines an inside diameter and an outside diameter such that a ratio of the outside diameter to the inside diameter lies in the range of 1.3 to 1.8,
wherein the first side of the ring-shaped body has at least one axial protrusion which is configured to be inserted into at least one corresponding recess in the lamellar insulating element, and
wherein the axial protrusion comprises an insertion lug which is spaced apart from the central opening of the ring-shaped body.

14. A ring element comprising:
a ring-shaped body configured as an end plate for a laminated rotor core, the ring-shaped body having a circular outer perimeter shape without projections in a radial direction and having a first side and a second side, the first side being flat and configured to be placed against a lamellar insulating element on an end face of an axial end region of the laminated rotor core with the second side facing away from the laminated rotor core, the second side of the ring-shaped body having a convex partial surface arranged radially about a central opening of the ring-shaped body,
wherein the convex partial surface has a radius of curvature configured to support an inner layer of a rotor winding wound onto the laminated rotor core at the axial end region such that a minimum bending radius of the inner layer of the rotor winding supported on the convex partial surface is maintained,
wherein the ring-shaped body defines an inside diameter and an outside diameter such that a ratio of the outside diameter to the inside diameter lies in the range of 1.3 to 1.8, and
wherein the first side of the ring-shaped body has at least one axial protrusion which is configured to be inserted into at least one corresponding recess in the lamellar insulating element,
wherein the axial protrusion comprises an insertion lug which protrudes from the second side adjacent the central opening of the ring-shaped body.

* * * * *